United States Patent
Van Oirschot et al.

(10) Patent No.: US 7,056,429 B2
(45) Date of Patent: Jun. 6, 2006

(54) PUSH BELT, RING ELEMENT AND METHOD AND DEVICE FOR ELECTROCHEMICAL MACHINING THEREOF

(75) Inventors: Cornelis Hendricus Maria Van Oirschot, Tilburg (NL); Jozias Pieter Polderman, Tilburg (NL)

(73) Assignee: Van Doorne's Transmissie B.V., Tilburg (NL)

(*) Notice: Subject to any disclaimer, the term of this patent is extended or adjusted under 35 U.S.C. 154(b) by 305 days.

(21) Appl. No.: 10/456,908

(22) Filed: Jun. 9, 2003

(65) Prior Publication Data
US 2003/0226765 A1 Dec. 11, 2003

(30) Foreign Application Priority Data
Jun. 7, 2002 (NL) .................................. 1020809

(51) Int. Cl.
*B23H 9/02* (2006.01)
(52) U.S. Cl. ........................ 205/652; 205/640
(58) Field of Classification Search .................... None
See application file for complete search history.

(56) References Cited

U.S. PATENT DOCUMENTS 3,803,014 A 4/1974 Atkinson
4,661,089 A 4/1987 Cuypers

FOREIGN PATENT DOCUMENTS

| EP | 511557 A1 * | 4/1992 |
| EP | 0 511 557 | 11/1992 |
| GB | 1226273 | 3/1971 |
| NL | 1014450 | 8/2001 |

* cited by examiner

*Primary Examiner*—Roy King
*Assistant Examiner*—Michael P. Alexander
(74) *Attorney, Agent, or Firm*—Young & Thompson

(57) ABSTRACT

Method for deburring and/or rounding a side face of a thin-sheet and annular metal element (1), such as a ring element (1) for use in a push belt for continuously variable transmission, wherein the ring element (1), in a machining step, is received in a device for electrochemical machining ("ECM") of the ring element (1), an electrode (5) being positioned in the device opposite an axially oriented side face (3) of the ring element (1), which electrode (5), as seen in a thickness or radial direction of the ring element (1), has a dimension which is at least twice as great as a dimension of the ring element (1) in the said thickness direction.

20 Claims, 2 Drawing Sheets

PUSH BELT, RING ELEMENT AND METHOD AND DEVICE FOR ELECTROCHEMICAL MACHINING THEREOF

BACKGROUND OF THE INVENTION

The present invention relates firstly to a method for electrochemically machining, in particular deburring, and/or rounding the edges of a thin-sheet ring element.

DESCRIPTION OF THE RELATED ART

The deburring and/or rounding of ring elements is known from the rounding of ring elements, also known as belt cords, for push belts of the type having at least one ring element or a set of a number of radially stacked ring elements, over the circumference of which a virtually continuous row of transverse elements are positioned and used for transmitting power between two pulleys, such as in continuously variable transmissions for relatively high powers, as used in a drive train for passenger vehicles. One example of this is European Patent Application EP-A-0181670 in the name of the applicant. In the abovementioned application, the edge of the ring element is rounded or at least thinned by means of a mechanical rolling process. It is also known to deburr and round the rings by means of what is known as a drum process, the ring elements being deburred, rounded and hardened slightly on the surface in a bath of vibrating machining grit.

Patent application NL-A-1014450, likewise in the name of the applicant, describes an electrochemical method (ECM technique) for dividing a tube into rings, in such a manner that ring elements whose edges are free of burrs and rounded are obtained from the outset. A process of this type eliminates the need for both existing machines for deburring, for example drum machines, and existing machines for accurately cutting rings.

SUMMARY OF THE INVENTION

The ECM technique for deburring and rounding which has previously been used in accordance with the applicant's details has the advantage that smooth, uniform rounding is obtained in a controlled way and virtually without damage such as scratches. Therefore, it is an object of the applicant to widen the possible uses for the ECM technique and/or to widen the choice of technologies which can be used to produce deburred and rounded ring elements, at least for belt cords of a push belt of the said type, specifically using the ECM technique. Another object is to create the possibility of using the abovementioned technique in combination with conventional cutting machines in situations in which the latter are already present in a factory or to create an alternative to the drum process.

According to the invention, this object is achieved in a favourable way if a method according to the characterizing clause of Claim 1 is used. According to this method, a cathode is positioned opposite an axial side face whose edges are to be deburred and/or need to be rounded i.e. parallel to that surface or transversely with respect to the centre line between the two main faces of the workpiece, the width of which cathode, i.e. its dimension in the thickness direction of the ring element, is a multiple of the nominal thickness of the ring element. An arrangement of this type ensures that the potential field is distributed around the workpiece in such a manner that in addition to deburring advantageous rounding of the side face is also achieved, if desired in combination with a uniform thinning of the ring element. In this context, the axial cutting surface is also referred to as the end edge of the ring element.

It should be noted that the deburring of workpieces with the aid of the ECM technique is known per se from British patent publication GB 1 226 273. However, this publication does not give any indication of achieving the object of the present invention, i.e. of also advantageously rounding side faces of a ring element. It is known from U.S. Pat. No. 3,616,347 to use a variable voltage and a variable supply of electric current, for example between 1500 and 3000 amperes per square inch. However, according to the present invention, the supply of current is completely reduced to zero at predetermined times during a machining operation, and consequently the invention involves the alternating presence and absence of electric current, i.e. current pulses.

BRIEF DESCRIPTION OF THE DRAWINGS

The invention will be explained in more detail below with reference to a drawing showing an exemplary embodiment, in which.

DESCRIPTION OF THE PREFERRED EMBODIMENTS

In the figures, corresponding components are denoted by identical reference symbols.

Figure 1:
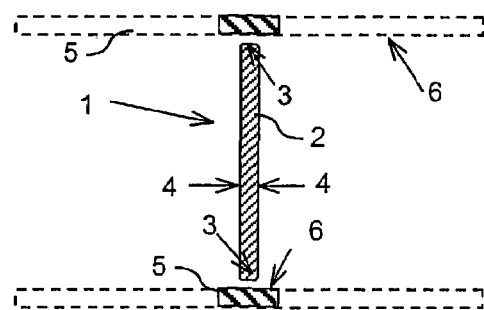
FIG. 1 diagrammatically depicts the method according to the invention, which illustrates that a cathode according to the invention has to be at least a number of times wider than the thickness of the workpiece.

FIG. 1 shows a cross section 2 through an annular ring element 1 or workpiece 1, of which the short sidewalls 3, i.e. the side faces 3 extending in the thickness direction, or end edges 3, are each positioned opposite an electrode 5. The continuous line indicates, in cross section, electrodes 5 with a transverse dimension which is approximately three times as great as the transverse or thickness dimension of the ring element 1. The dashed lines illustrate electrodes 5 which are many times wider than the ring element.

The electrodes 5, or at least their active surfaces 6 directed towards the workpiece 1, are oriented virtually perpendicular to a main face 4 of the ring element 1 and therefore substantially parallel to an end edge 3 thereof. If the ring element 1 is of annular design, the main faces 4 are radially oriented. During the ECM process, the electrodes 5 are in the electrical sense connected as cathodes, and the ring element 1 is connected as an anode, and a voltage or current, preferably pulsed, is applied between the electrodes 5 and the workpiece 1, the space between the electrodes 5 and the workpiece 1 being filled with an electrolyte, which electrolyte is continuously refreshed by making it flow along the workpiece 1. Under the influence of an electric current applied between the cathodes 5 and the anode 1, material of the ring element 1 is dissolved in the electrolyte and discharged as a result of the flow of the electrolyte.

According to the invention, a surface 6 of the electrode 5 which faces towards the workpiece 1 has a width which is at least twice as great as the width or thickness D of the ring element 1 and according to the invention, for specific rounding circumstances, may even be up to fifty times wider. However, according to the invention a width ratio of approximately a factor of 6 is preferred, since this value results in rounding of the ring element which is optimum for use in the push belt.

Figure 2A:
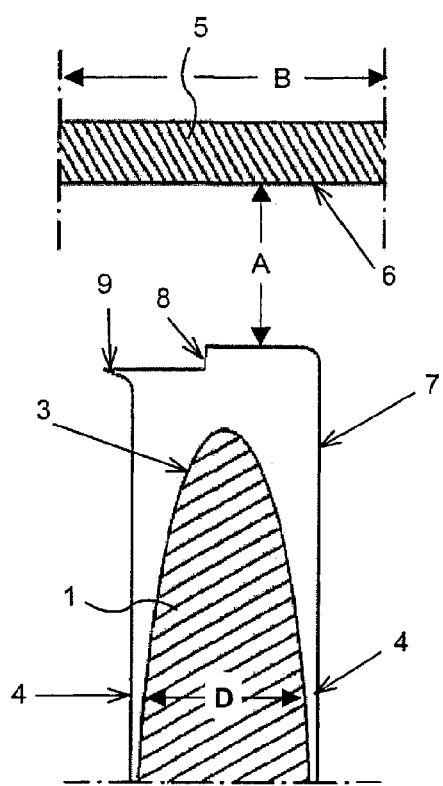
FIGS. 2(A and B) diagrammatically depicts the effect of the method on the ring element for different cathode widths and cathode workpiece spacings.
Figure 2B:
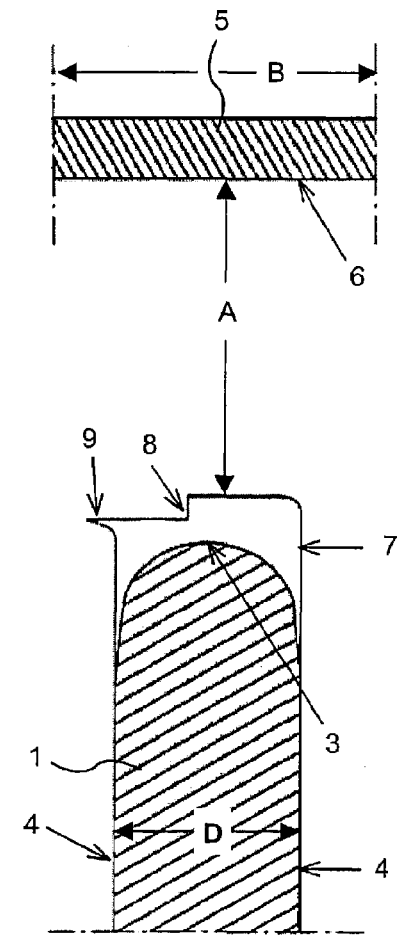

FIG. 2, i.e. parts 2A and 2B thereof, illustrate the effect of the width B of the cathode 5, as mentioned in the description of FIG. 1, with respect to the thickness D of the ring element 1 or the anode 1. In FIGS. 2A and 2B, the contour lines 7 indicate the starting contour 7 of the workpiece, while the cross sections 1 which are also illustrated represent the ring element 1 after the end of the ECM process. In these tests, the ring element 1 was formed as a continuous ring, the left-hand side of the cross section forming the radially inner side of the ring 1 and the right-hand side its radially outer side. The starting contour 7 shows a step 8 and a burr 9. In this example, the step 8 forms the delineation between an edge part on the right-hand side of the step 8 which has been separated from a larger unit by a cutting process, while the section to the left-hand side of the step 8 forms a part which has been detached by shearing or being torn off. The left-hand side of the figure also shows an undesired and sharp burr 9 which may form during the abovementioned separation. Both the non-uniformity or step 8 resulting from the element 8 not having been cut over its entire height and the burr 9 disappear under the influence of the ECM machining according to the invention without leaving a discernible effect in the symmetry of the end result, as can be seen from the cross sections 1.

FIGS. 2A and 2B differ in terms of the process settings used. For example, in FIG. 2A, the end result, i.e. the cross section 1, is achieved with the aid of a cathode 5 which is more than twenty times as wide as the cathode 5 used for the section shown in FIG. 2B and more than fifty times as wide as the thickness D of the workpiece 1, i.e. the radial dimension of the ring element 1. Furthermore, the starting distance A between cathode 5 and ring element 1, i.e. the starting contour 7 thereof, in FIG. 2A approximately corresponds to the said thickness D of the workpiece, while in FIG. 2B it is more than twice as great as this thickness D. These two process parameters are important factors in determining the potential field which is formed during the ECM process for a set voltage between cathode 5 and anode 1 and therefore the distribution of the reduction of material over the circumference of the workpiece 1, in this case the ring element 1. It should be noted that increasing the width B of the electrode 5 and reducing the said distance A both have a similar effect on the end product obtained, as indicated by the cross sections 1 in FIGS. 2A and 2B.

According to the invention, the two illustrations 2A and 2B form extremes in terms of suitable execution of the ECM process in combination with ring elements 1 for push belts. In the more or less extreme embodiments of the ECM process which are illustrated and in the range of widths B and distances A between them, an end result with an advantageously rounded side face 4 of the ring element 1 is obtained. In the embodiment shown in FIG. 2A, the rounding extends relatively far into the side faces 4, while in FIG. 2B it does not. Therefore, in the arrangement shown in FIG. 2A, greatly thinned edges of the ring element 1, i.e. with a decreasing thickness D of the ring element in the direction of the side face 2, are obtained, as may be desired, while in FIG. 2B the result is rounding in which the side face 2 has an elliptical appearance with a relatively large rounding radius centrally between the two main faces 4, merging into the main faces 4 via a rounding of limited radius. The elongate, smooth rounding of the former appearance (FIG. 2A) will generally be preferred if, during use of the ring element, bending stresses are the crucial factor in determining the fatigue strength, while the latter appearance (FIG. 2B) is more suitable for transmitting tensile stress, since in this case the maximum availability of the surface area of a cross section of the ring element for transmission of force is achieved. According to the invention, an intermediate form of the side face 2, as obtained with a width ratio (B/D) between cathode 5 and workpiece 1 of around 6 is particularly suitable for use in combination with tensile and bending stress levels as typically occur in the abovementioned passenger vehicle application thereof. An optimum distance A between the electrodes 5 and 1 has been determined to be 1 to 4 times the workpiece thickness D, preferably approximately 2.5 times.

According to the invention, the cross sections 1 illustrated are obtained after the end of the ECM process, after the side face 2 has been dissolved to a defined degree, i.e. after the axial dimension of the workpiece 1 has been reduced to such an extent that discontinuities resulting from the way in which it has been cut out have virtually disappeared from the starting contour 7.

Figure 3:
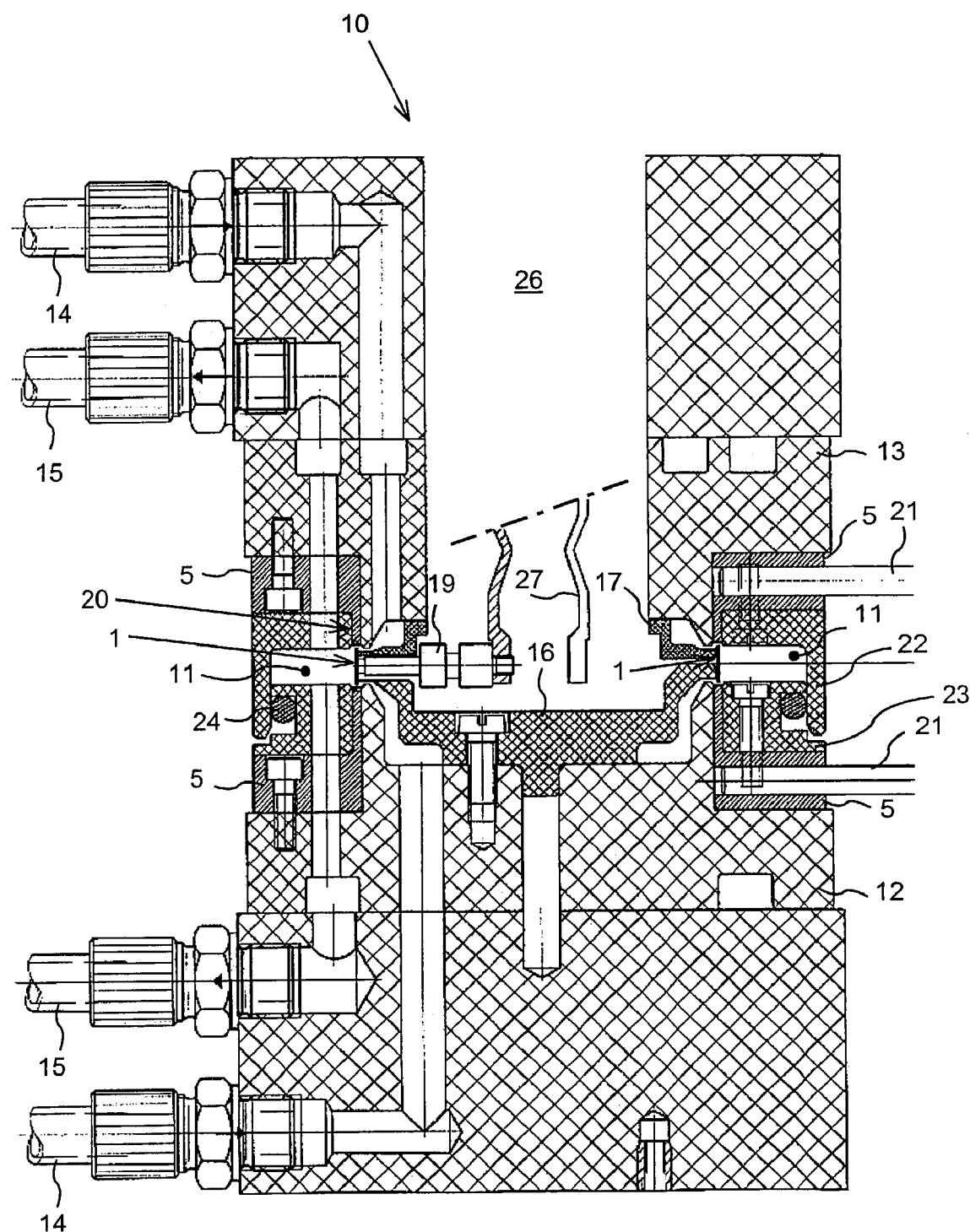
FIG. 3 diagrammatically depicts a device for carrying out the method according to the invention.

FIG. 3 shows an example of a device 10 in which, in accordance with the illustrations presented in the preceding figures, the main principle of the method according to the invention is advantageously carried out. As mentioned above, the device comprises a chamber for receiving the ring element 1, in this case an annular chamber 11 which is incorporated between a top part 13 and a bottom part 12 of the device 10. Inlet passages 14 and outlet passages 15 for supplying and discharging an electrolytic liquid are connected to both the top side and the bottom side of the chamber 11. The passages 14 and 15 are in part formed in the blocks 12 and 13 and in part by tube pieces connected to them. In each top and bottom part 12 and 13 of the device there are at least two outlet passages 15 and two inlet passages 14 connected to the chamber 11, distributed over the periphery thereof. On the inner side of the ring, the chamber 11 is delimited by a bottom fixed insert 16, and a top insert 17, the height of which can move in the axial direction together with the top part 13. If the workpiece 1 is not endless, according to the invention support elements for holding the workpiece in strip form in the shape of a ring in the chamber 11 may, according to the invention, be arranged in the part of the chamber 11 which is on the outer side with respect to the workpiece 1. The inserts 16, 17 are accommodated in the part of the chamber 11 which is on the inner side with respect to the workpiece 1 in such a manner and are shaped with the aid of peripheral parts in such a manner that conduits for the electrolytic liquid, which is to be supplied under pressure, are formed all the way to near the radially inner surface of the workpiece 1. The inserts 16 and 17 are shaped to match the shape of the workpiece. Nevertheless, the device preferably comprises at least one clamping element 19 which can be activated as required as a function of a state in which the top and bottom parts of the device do or do not form a closed unit. The clamping element 19 also has the function of acting as an electrical conductor for the workpiece 1, so that the latter, during the machining, can be used as an electrode, in particular as an anode 1.

The bottom part 12 and the top part 13 of the device are narrowed annularly in the vicinity of the chamber 11, in such a manner that an annular cathode part 20 is incorporated, this cathode part being provided with an electrical connection 21. The voltage or current between the cathodes 20 and the anode 1 is pulsed on and off with the aid of an electronic control system (not shown in the drawing). The cathode 20 has an axially oriented working surface which, according to the description given in connection with FIGS. 1 and 2, is at least a few times as thick in the radial direction as the radial thickness of the workpiece 1. The moveable insert 17 and the clamping element 19 can be moved in the axial direction by means of positioning means 27 (not shown in more detail in the drawing) and by means of the longitudinal guide formed by an axial opening 26 incorporated centrally in the top part 13. The cathode 20 is in turn likewise narrowed, in such a manner that at the location of the narrowing adjoining peripheral top and bottom closure rings 22 and 23 are incorporated, one ring 22 at least partially surrounding the other ring 23 by means of a radially and axially running surface, and the other ring 23 being provided with a concentric recess which accommodates an elastically deformable sealing ring 24, for example an O-ring.

After the device 10 has been closed, i.e. the two parts have been positioned in such a manner with respect to one another but the closure rings 22 and 23 are in a surrounding position, with contact of the sealing ring 24 between the two parts, the clamping element 19 and then the positioning means are activated. As a result, the ring element 1, which is arranged resting freely on the bottom cathode 5 in the device 10, is positioned centrally in the axial direction between the cathode 5 of the bottom and top device parts 12 and 13, specifically at a distance which is within the preferred range of the invention. The control system switches on the supply of electrolytic liquid and then produces a pulsed electric current between the electrodes 1 and 5, i.e. the workpiece 1 and the cathodes 5. The control system preferably produces the said current by applying a square-wave voltage between the electrodes 1 and 5, which square-wave voltage varies between zero volts and a specific settable value.

A machining operation of this type is carried out for a predetermined time of the order of magnitude of a few seconds, after which the parts 12 and 13 are moved away from one another in the axial direction by means of a positioning means, which is likewise not shown and is automatically actuated, so that the ring element 1 can advantageously be removed with the aid of removal means, which are likewise automatically operated, and another workpiece can be put in place for machining in a corresponding way. The ring element 1 and the two cathodes 5 are held in their original position during the machining, so that the distance between the cathode 5 and the annular element 1 increases as the machining continues, and the dissolution of material from the workpiece 1 automatically slows if the control system sets the voltage difference between the cathodes 5 and the anode 1, i.e., in the case of the above-mentioned square-wave voltage, sets a constant maximum level during the machining.

The present invention is not restricted to the embodiments described above, but rather also relates to the information in and meaning of the drawing which will be clearly and unambiguously apparent to the person skilled in the art and also in particular to the content of the appended claims.

The invention claimed is:

1. Method for deburring and rounding a side face of a thin-sheet and annular metal ring element (1) of a push belt for a continuously variable transmission, comprising:
   an electrochemical machining step that receives a thin-sheet and annular metal ring element (1) of a push belt for continuously variable transmission in a device (10) for electrochemical machining of the ring element (1), an annular electrode (5, 20) being positioned in the device (10) i) opposite an axially oriented annular side face (3) of the ring element (1) along an entire circumference thereof, and ii) at the same time, located in such close proximity distance relative to the side face of the ring element that deburring and a rounding-off of said side face (3) takes place during the electrochemical machining,
   which electrode (5, 20), as seen in a thickness or radial direction of the ring element (24, has a dimension (B) which is at least twice as great as a dimension (D) of the ring element (1) in the thickness direction.

2. Method according to claim 1, characterized in that the dimension (B) of the electrode (5, 20) is between twice and fifty times as great as the dimension (D) in the thickness direction of the ring element (1).

3. Method according to claim 1, characterized in that the working surface of a cathode (5), in two dimensions, extends at least substantially perpendicular to a main face (4) of the ring element (1).

4. Method according to claim 1, characterized in that the distance (A) between the electrode (5, 20) and the ring element (1) is in the range from one to four times the dimension (D) in the thickness direction of the ring element (1).

5. Method according to claim 1, characterized in that during the electrochemical process an electrolyte is supplied to a specified first radial side of the ring element (1) and is discharged on a second side opposite to the first side.

6. Method according to claim 5, characterized in that the electrolyte is supplied at an excess pressure, preferably at an excess pressure of at least 1 bar.

7. Method according to claim 1, characterized in that the electrochemical process is carried out with an electric current or voltage which is pulsed on and off between the electrode (5, 20) and the ring element (1).

8. Method according to claim 2, characterized in that the working surface of a cathode (5), in two dimensions, extends at least substantially perpendicular to a main face (4) of the ring element (1).

9. Method according to claim 2, characterized in that the distance (A) between the electrode (5, 20) and the ring element (1) is in the range from one to four times the dimension (D) in the thickness direction of the ring element (1).

10. Method according to claim 3, characterized in that during the electrochemical process an electrolyte is supplied to a specified first radial side of the ring element (1) and is discharged on a second side opposite to the first side.

11. Method according to claim 4, characterized in that during the electrochemical process an electrolyte is supplied to a specified first radial side of the ring element (1) and is discharged on a second side opposite to the first side.

12. Method according to claim 1, wherein, said positioning of the electrode proximate the side face of the ring element obtains an evenly symmetrically distributed shape of rounding-off of the ring side face of the ring element.

13. Method according to claim 1, characterized in that the distance (A) between the electrode (5, 20) and the ring element (1) is approximately 2.5 times the dimension (D) in the thickness direction of the ring element (1).

14. Method according to claim 1, characterized in that the dimension (B) of the electrode (5, 20) is approximately six times as great as the dimension (D) in the thickness direction of the ring element (1).

15. Method according to claim 1, wherein, said positioning of the electrode proximate the ring element obtains, at the same time, an evenly symmetrically distributed shape of rounding-off of the both sides of the ring element.

16. Method according to claim 1, wherein, during the electrochemical machining, active surfaces of the electrode are oriented virtually perpendicular to a radially-oriented main face of the ring element and substantially parallel to an end edge of the ring element.

17. Method for deburring and rounding a continuous variable transmission ring element, comprising the steps of:
- receiving a continuous variable transmission annular ring element in a electrochemical machining device (10), the ring element having an axially oriented annular side face (3);
- electrochemical machining to both deburr and round-off the side face by positioning an annular electrode i) opposite the side face along an entire circumference of the side face, and, at the same time, ii) proximate to the side face, wherein,
- the electrode (5, 20), as seen in a radial thickness direction of the ring element (1), has a dimension (B) which is at least twice as great as a dimension (D) of the ring element (1) in the thickness direction.

18. The method of claim 17, wherein, the machining step the positioning of the electrodes provides a potential field distributed around the ring element so that the round-off provides simultaneous uniform thinning of the ring element on both sides of the ring element.

19. Method for deburring and rounding a continuous variable transmission ring element, comprising the steps of:
- receiving a continuous variable transmission annular ring element in a electrochemical machining device (10), the ring element having a two radially-oriented main faces (4) an end edge (3), and an edge circumference;
- positioning an annular electrode along the entire edge circumference of the ring element, the active surfaces of the annular electrode oriented virtually perpendicular to the main faces of the ring element and substantially parallel to the end edge of the ring element; and
- positioning the electrode at a machining distance (A) proximate the end edge of the ring element to simultaneously both deburr and round-off, by electrochemical machining, the end edge and adjacent main faces of the ring element, wherein,
- the electrode, as seen in a radial thickness direction of the ring element, has a dimension (B) which is at least twice as great as a dimension (D) of the ring element in the thickness direction, and
- during the machining, the machining distance (A) between the electrode and the end edge of the ring element is in a range from one to four times the dimension (D) in the thickness direction of the ring element (1).

20. The method of claim 19, wherein, during the machining, the machining distance (A) between the electrode and the end edge of the ring element is approximately 2.5 times the dimension (D) in the thickness direction of the ring element (1).

* * * * *